(12) United States Patent
Daisenberger et al.

(10) Patent No.: US 8,556,218 B2
(45) Date of Patent: Oct. 15, 2013

(54) STOP BRAKE FOR A TRIPOD HEAD

(75) Inventors: Bartholomäus Daisenberger, Weilheim (DE); Dagmar Wessels, München (DE); Martin Giersiepen, München (DE)

(73) Assignee: Camera Dynamics GmbH, Eching (DE)

( * ) Notice: Subject to any disclaimer, the term of this patent is extended or adjusted under 35 U.S.C. 154(b) by 181 days.

(21) Appl. No.: 13/131,998

(22) PCT Filed: Sep. 23, 2009

(86) PCT No.: PCT/EP2009/062321
§ 371 (c)(1), (2), (4) Date: Jul. 8, 2011

(87) PCT Pub. No.: WO2010/063501
PCT Pub. Date: Jun. 10, 2010

(65) Prior Publication Data
US 2011/0290598 A1  Dec. 1, 2011

(30) Foreign Application Priority Data
Dec. 2, 2008 (DE) ............. 20 2008 015 942 U

(51) Int. Cl.
*F16M 11/06* (2006.01)
*F16M 11/12* (2006.01)

(52) U.S. Cl.
USPC .......... 248/185.1; 248/178.1; 188/31; 188/69

(58) Field of Classification Search
USPC .............. 188/28, 31, 68, 69, 70 R, 72.8; 248/177.7, 178.1, 185.1
See application file for complete search history.

(56) References Cited

U.S. PATENT DOCUMENTS

| 2,111,012 | A |   | 3/1938  | Tondreau |          |
|-----------|---|---|---------|----------|----------|
| 2,458,872 | A | * | 1/1949  | Pagliuso | 248/183.2|
| 2,719,690 | A | * | 10/1955 | Zucker   | 248/183.3|
| 3,954,160 | A | * | 5/1976  | Carr     | 188/72.7 |
| 5,092,433 | A |   | 3/1992  | Endo     |          |

FOREIGN PATENT DOCUMENTS

| DE | 1256901       | 12/1967 |
| DE | 77 12 121 U1  | 12/1977 |
| FR | 2 643 433 A1  | 8/1990  |

OTHER PUBLICATIONS

International Search Report and Written Opinion for PCT/EP2009/062321, filed Dec. 23, 2009, Camera Dynamics GmbH.
International Preliminary Report on Patentability for PCT/EP2009/062321, filed Jun. 7, 2011 Camera Dynamics GmbH.

* cited by examiner

*Primary Examiner* — Thomas J Williams
(74) *Attorney, Agent, or Firm* — Hodgson Russ LLP

(57) ABSTRACT

Disclosed is a stop brake for a tripod head, particularly for film or television cameras. The tripod head may include (a) a substantially cylindrical brake caliper, which has a main body for insertion into a receiving opening in a housing part of the tripod head and (b) a brake block for engaging with a brake disk, and (c) a locking device in order to engage and disengage the brake block with/from the brake disc. An expanding section is provided in the region of the outer circumference of the main body of the brake caliper. The expanding section is deflected radially outward in the direction of an inside wall of the receiving opening upon engaging the brake block with the brake disc.

17 Claims, 6 Drawing Sheets a)

b)

STOP BRAKE FOR A TRIPOD HEAD

TECHNICAL FIELD

The present invention relates to a stop brake for a tripod head, particularly for film or television cameras. The stop brake comprises a substantially cylindrical brake caliper, which has a main body for insertion into a receiving opening formed in a housing part of the tripod head and a brake block for engaging with a brake disk provided in the tripod head. The stop brake additionally has a locking device in order to engage the brake block with and disengage the brake block from the brake disk.

PRIOR ART

Tripod heads of the type referred to above are known per se and are used to pivot the camera about at least two axes that are perpendicular to each other.

For example, DE 40 09 026 C1 discloses such a tripod head with a panning device for pivoting the camera about a vertical pivot axis and a tilting device for tilting the camera about a tilt axis running horizontally.

Some of these known tripod heads have a stop brake with which the camera can be locked in various pan and/or tilt positions. In a known configuration, these stop brakes have a brake caliper which is insertable in a receiving opening in a housing part of the tripod head. By means of a locking screw, the brake caliper may be engaged with or disengaged from a brake disk.

However, due to tolerances in the dimensions of the components used, there is play present in the conventional stop brakes, particularly between the brake caliper and the receiving opening in the housing part. As a result, even when the stop brake is locked in position, it is still possible for the camera to shake slightly. This has an annoying effect when the camera is in use.

PRESENTATION OF THE INVENTION

The object of the present invention is to create a stop brake for a camera tripod head with which the camera can be locked in the desired pan and/or tilt position with the least play possible.

This object is achieved by a stop brake for a camera tripod head.

Consequently, provided in the region of the outer circumference of the main body of the brake caliper is an expansion section which is deflected radially outwards towards an inner wall of the receiving opening when the brake block is engaged with the brake disk.

This deflection of the expansion section of the brake caliper towards the inner wall of the receiving opening causes the outer circumference of the brake caliper's main body to be pressed firmly against the inner wall of the receiving opening and prevents or at least avoids play between the brake caliper and receiving opening.

Preferred optional features are described in the dependent claims.

Radial deflection of the expansion section on engaging the brake block with the brake disk takes place preferably by means of two complementary wedge surfaces moveable in relation to each other.

The locking device for engaging the brake block with and disengaging the brake block from the brake disk is preferably a locking screw having an external thread which cooperates with an internal thread formed in the main body of the brake caliper. The brake caliper is tightened against the brake disk when the locking screw is tightened. In this case, the external thread on the locking screw and the internal thread in the main body of the brake caliper form the two complementary wedge surfaces moveable in relation to each other that bring about the radial deflection of the expansion section of the brake caliper.

With regard to configuration of the expansion section, it is possible for the expansion section to be an integral component of the main body of the brake caliper, which is widened at least partially towards an inner wall of the receiving opening when the brake block engages with the brake disk. The brake caliper is wedged in the receiving opening due to this widening of the expansion section of the brake caliper. In this case, the main body of the brake caliper as the expansion section may have, for example, at least one lobe which is deflectable towards the inner wall of the receiving opening when the brake caliper engages with the brake disk.

Alternatively, however, the expansion section may also be a separate expansion element which is disposed on the outer circumference of the main body of the brake caliper. For example, a separate expanding ring which is disposed around the outer circumference of the main body of the brake caliper may be used as the expansion element. At least one moveable wedge element may also be disposed as an expanding element on the outer circumference of the main body of the brake caliper. In both cases, radial deflection of the expansion section on engaging the brake block with the brake disk again takes place preferably by means of two complementary wedge surfaces moveable in relation to each other, one of which is formed on the expansion element and the other on the main body of the brake caliper.

BRIEF DESCRIPTION OF THE DRAWINGS

The enclosed drawings show

DETAILED DESCRIPTION OF PREFERRED EMBODIMENTS OF THE INVENTION

FIGS. 1 to 5 show a first preferred embodiment of the stop brake according to the invention. FIG. 6 shows a second preferred embodiment.

Figure 1:
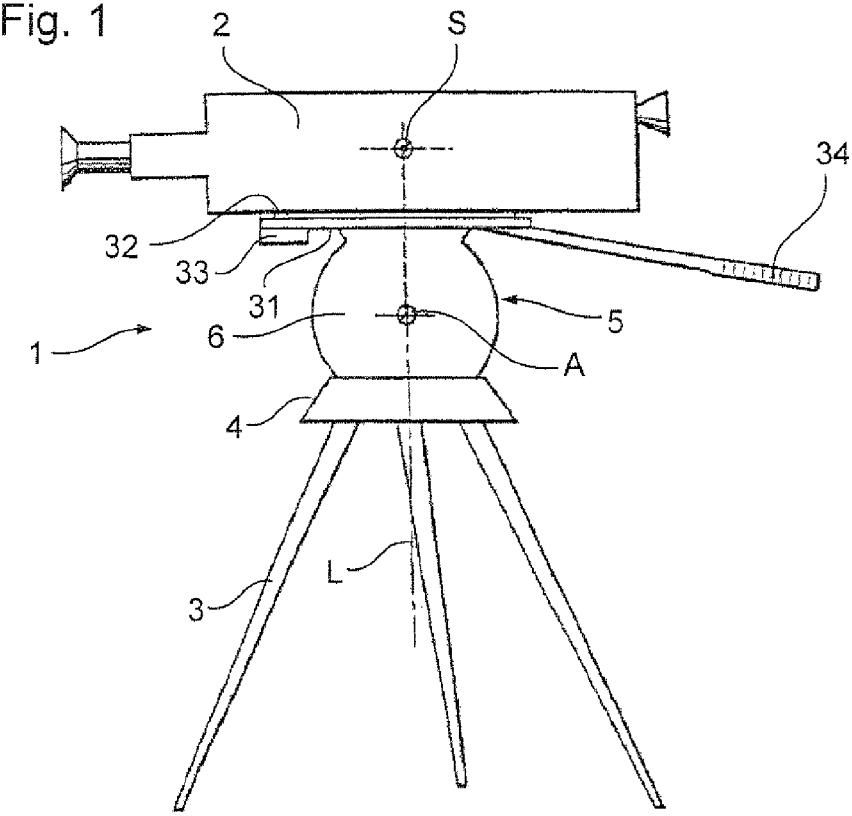
FIG. 1 a view of the camera tripod with tripod head and camera mounted thereon.

FIG. 1 shows a tripod head 1 for a film camera 2. Tripod head 1 is mounted on a three-legged tripod 3 and comprises a panning unit 4 and a tilting unit 5. By means of panning unit 4, camera 2 can be pivoted about a vertical pivot axis L and, by means of tilting unit 5, camera 2 can be tilted about a tilt axis A running horizontally.

To do this, tilting unit 5 essentially consists of a rotor 6 tiltable about tilt axis A and a stator (not illustrated) connected to tripod 3. Rotor 6 is connected to a supporting platform 31. Camera 2 for its part sits on a slide arrangement 32 which is moveable within supporting platform 31 using an adjusting device 33. Tripod head 1 can be tilted about horizontal tilt axis A and can be pivoted about vertical pivot axis L by means of handles 34.

The reference figure S denotes the center of gravity of camera 2.

To then be able to lock camera 2 in any desired tilt position, tilting unit 5 has a stop brake which will be described in detail below with reference to FIGS. 2 to 5.

Figure 2:
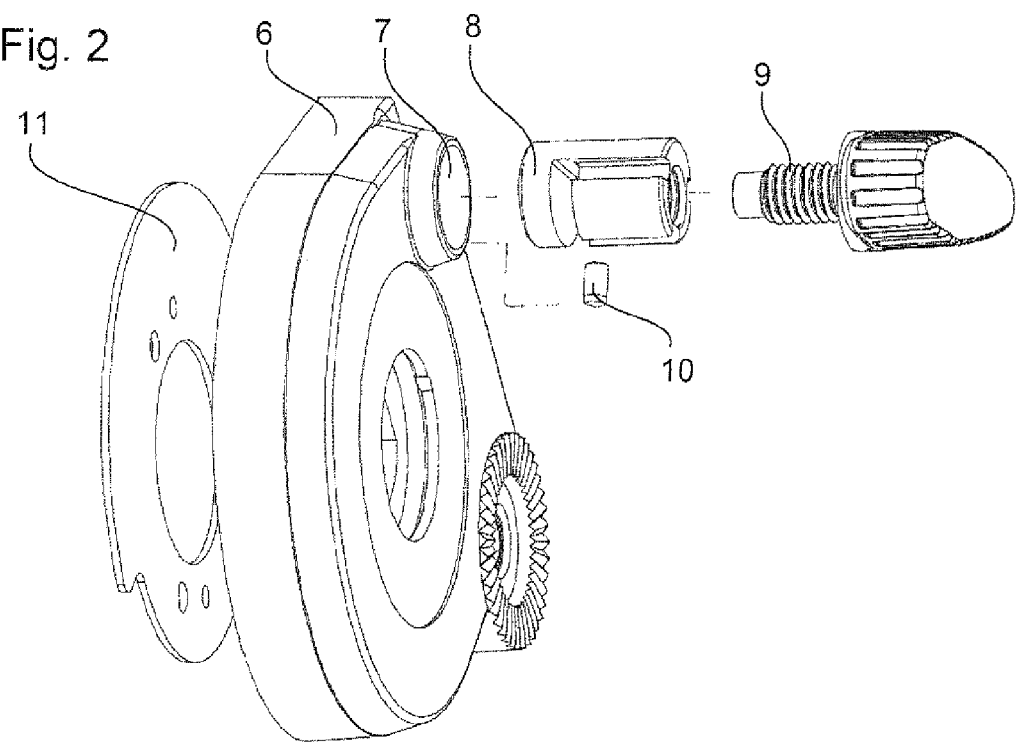
FIG. 2 an exploded view of a first preferred embodiment of the stop brake according to the invention.

The components of the stop brake and its arrangement on or in the housing of tilting unit 5 emerge initially from the exploded view of FIG. 2. The Figure shows a housing side part of rotor 6 in which a receiving hole 7 for a brake caliper 8 is formed. Also shown are a locking screw 9, a cylindrical pin 10 and a brake disk 11.

Figure 3:
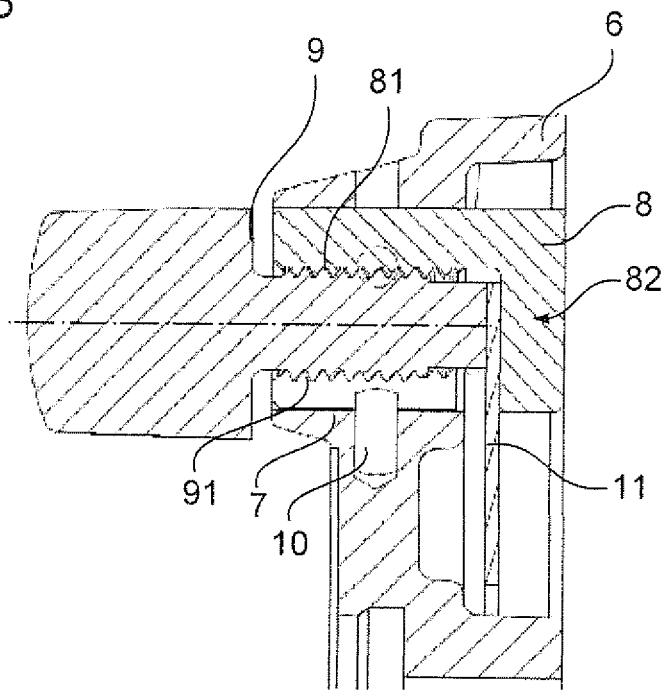
FIG. 3 a perspective view of the stop brake from FIG. 2.

FIG. 3 shows the installed condition of the stop brake in the housing side part of rotor 6. Brake caliper 8 has been inserted into receiving hole 7 in the housing side part of rotor 6. Cylindrical pin 10 prevents brake caliper 8 from rotating in receiving hole 7. Brake caliper 8 has an internal thread 81, which cooperates with an external thread 91 on locking screw 9. Brake disk 11 sits between an inside end of locking screw 9 and a brake block 82 which is part of brake caliper 8. When locking screw 9 is tightened, brake block 82 is drawn towards brake disk 11 and locks rotor 6 and consequently camera 2 in the desired tilt position.

Figure 4:
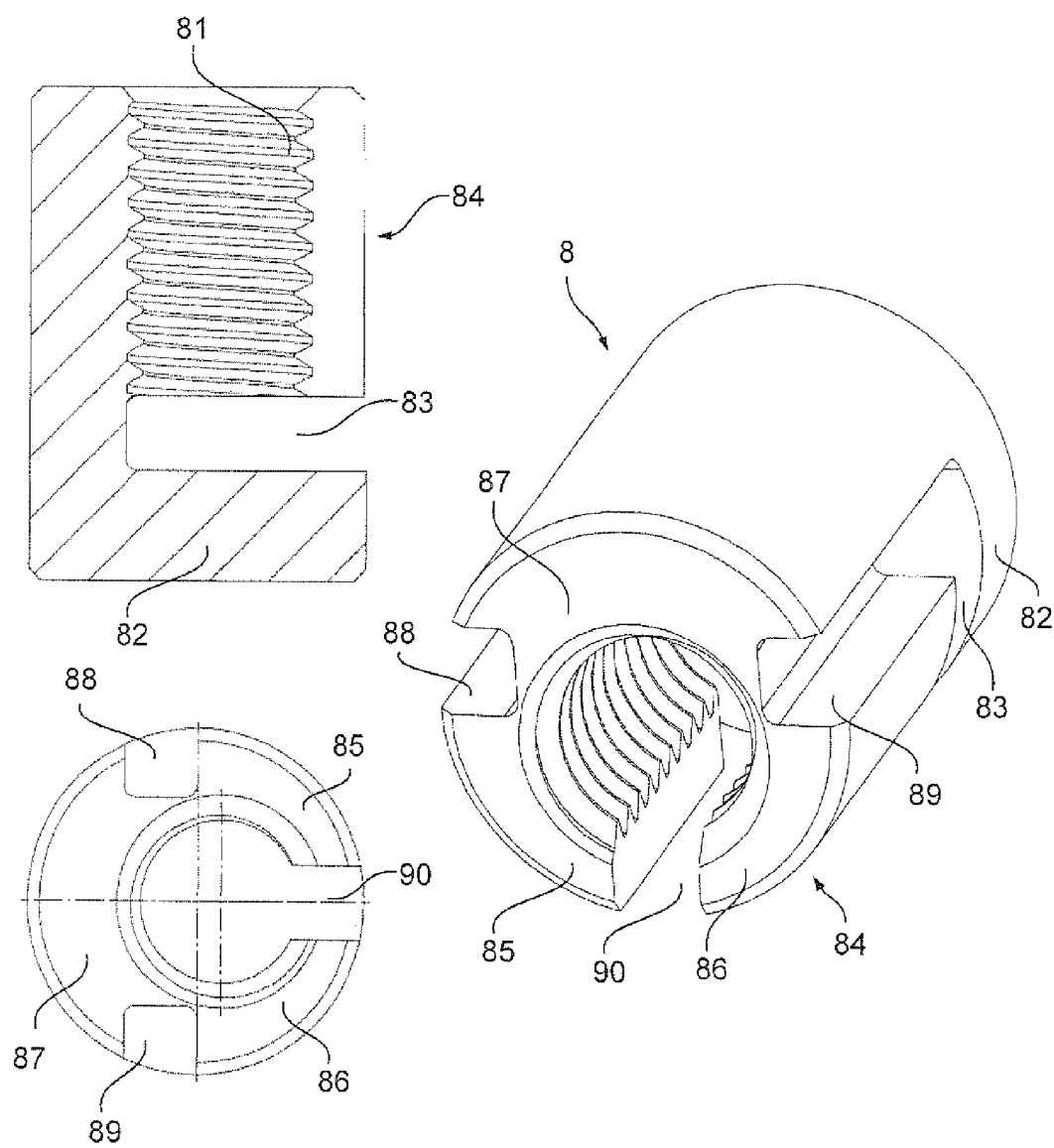
FIG. 4 a perspective view, front view and sectional view of a brake caliper of the stop brake from FIG. 2.

As emerges particularly from FIG. 4, brake caliper 8 is basically configured as a cylindrical component. Brake caliper 8 has on a first axial end said brake block 82 which forms a bottom surface of cylindrical brake caliper 8. Adjoining brake block 82 is a gap 83 for receiving brake disk 11.

Following in the axial direction on the other side of gap 83 is a main body 84 of brake caliper 8. Main body 84 is the region of brake caliper 8 which is inserted into receiving hole 7 in the housing side part of rotor 6. Formed in main body 84 is a through-hole which is arranged in the present embodiment slightly eccentrically in relation to the center line of cylindrical brake caliper 8 and is provided with an inner thread 81. Main body 84 and inner thread 81 extend from gap 83 to the other axial end of brake caliper 8.

Main body 84 of brake caliper 8 is now configured according to the invention such that any play between brake caliper 8 and receiving hole 7 is prevented or at least reduced. For this purpose, main body 84 of brake caliper 8 is configured with two lobes 85 and 86 which join onto a caliper section 87 in the circumferential direction of brake caliper 8. In this case, lobes 85 and 86 are joined to caliper section 87 of main body 84 via relatively thin-walled portions or reductions 88 and 89 such that a certain radial deflection of lobes 85 and 86 is possible in relation to caliper section 87. For their part, lobes 85 and 86 are separated from each other by an expansion opening 90 running axially to enable the mobility of lobes 85 and 86 and consequently widening of main body 84 radially outwards towards the inner wall of receiving opening 7 (cf. FIG. 3). In this respect, the two lobes 85 and 86, which are part of brake caliper 8, form an expansion section in the region of the outer circumference of main body 84 of brake caliper 8.

Brake block 82 of brake caliper 8 is tightened against brake disk 11 when locking screw 9 is tightened. Main body 84 of brake caliper 8 widens radially in the process. To explain this radial widening of main body 84 when tightening locking screw 9 in even greater detail, the forces acting in the threaded pairing between locking screw 9 and brake caliper 8 will now be described with reference to FIG. 5.

Figure 5:
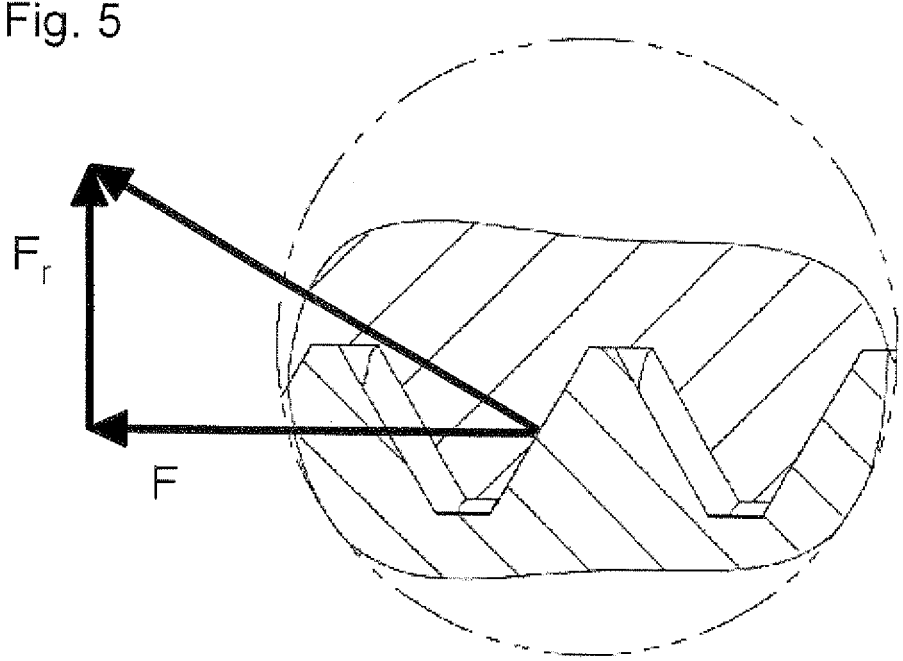
FIG. 5 an illustration of the forces acting in a thread of the stop brake.
Figure 6:
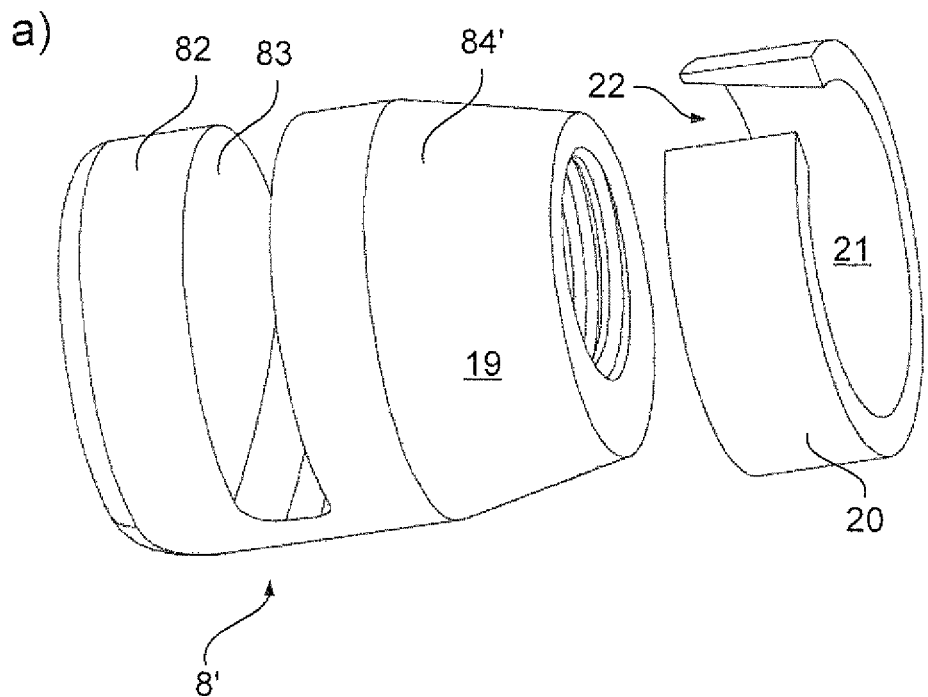
FIG. 6 a perspective view of a brake caliper and an expansion ring of a stop brake according to a second preferred embodiment of the invention.
Figure 6:
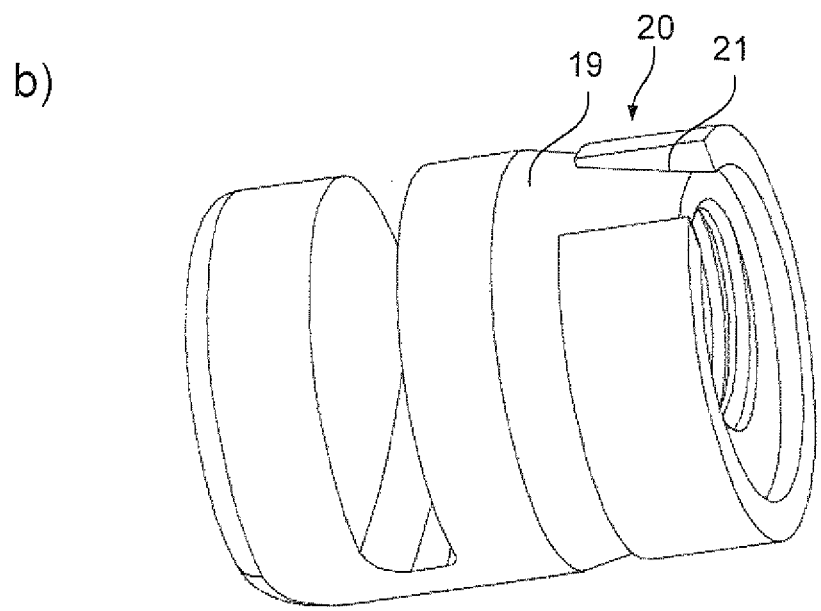

FIG. 5 represents a detail from FIG. 3 which shows external thread 91 formed on locking screw 9 engaged with internal thread 81 formed in the through-hole of main body 84 of brake caliper 8. On tightening locking screw 9, the thread flanks of internal thread 81 and of external thread 91 are pressed against each other with force F directed perpendicular to the flanks. This force F has an axial component Fa and a radial component Fr. This radial component Fr, which acts over the entire circumference of main body 84 of brake caliper 8, pushes movable lobes 85 and 86 of expansion region 84 radially outwards against the wall of receiving hole 7 in the housing side part of rotor 6. Brake caliper 8 is wedged in receiving hole 7 due to this widening of main body 84 of brake caliper 8.

In summary, it can be said that the radial deflection of brake caliper 8 towards the inner wall of receiving hole 7 in the first embodiment takes place due to cooperation of the complementary wedge surfaces that are formed by external thread 91 and internal thread 81.

Figure 7:
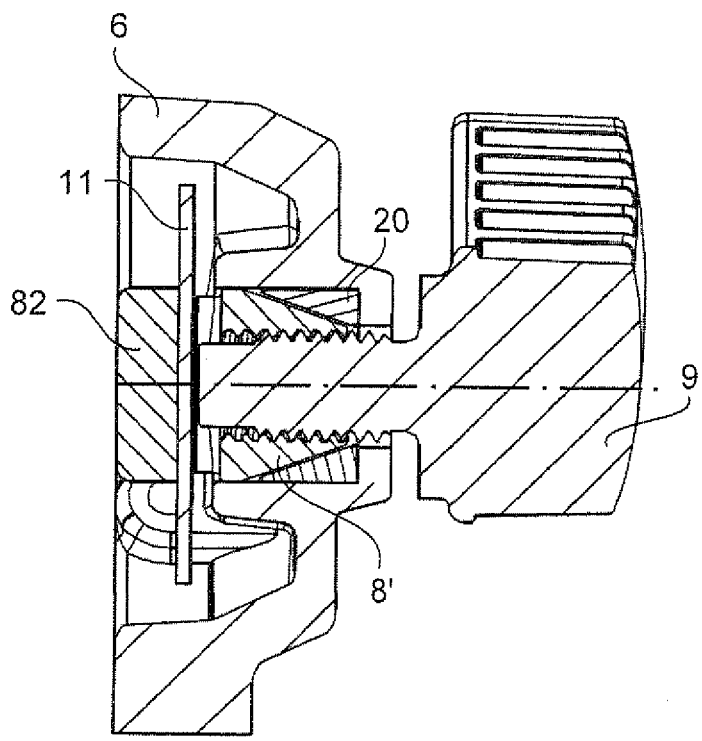
FIG. 7 a sectional view of the stop brake according to the second preferred embodiment.
Figure 8:
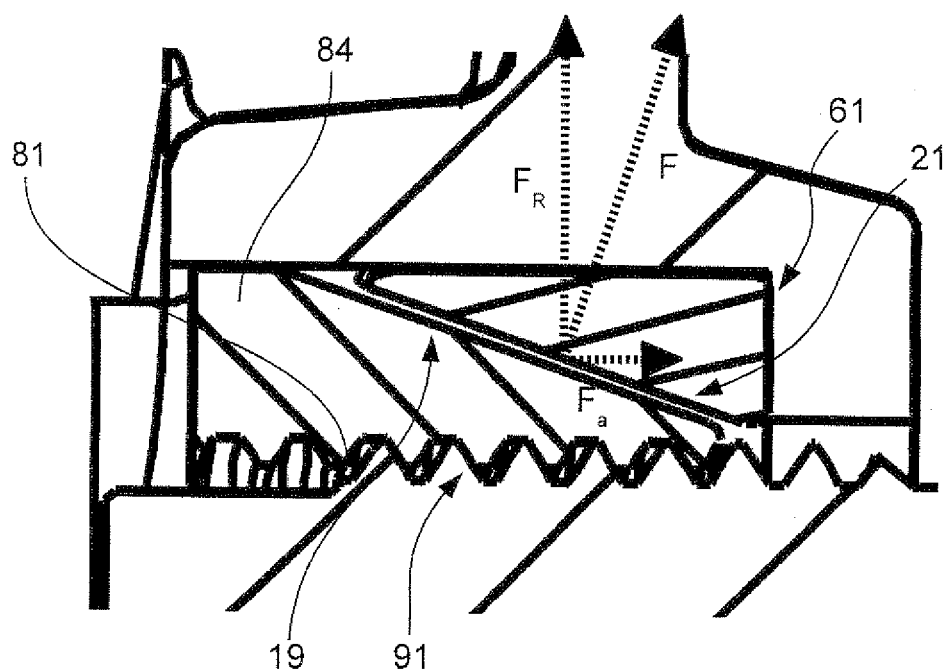
FIG. 8 an illustration of the forces acting in a stop brake according to FIG. 6.

FIGS. 6 to 8 show a second preferred embodiment of a stop brake according to the invention.

FIG. 6 shows a brake caliper 8' of a stop brake according to a second embodiment. Just like brake caliper 8 of the first embodiment, brake caliper 8' also has a brake block 82' and a main body 84', which are again separated from each other in the axial direction of cylindrical brake caliper 8' by a gap 83' for receiving brake disk 11. As emerges from FIG. 6, main body 84' of brake caliper 8' is tapered towards the end of brake caliper 8' which faces away from brake block 82' such that a wedge surface 19 is formed.

The arrangement of brake caliper 8' and expanding ring 20 in the housing side part of rotor 6 emerges from FIGS. 7 and 8. It becomes clear here that brake caliper 8' also has an internal thread 81 in this embodiment which cooperates with external thread 91 on locking screw 9. Brake disk 11 sits between an inside end of locking screw 9 and brake block 82'. When locking screw 9 is tightened, brake block 82' is drawn towards brake disk 11 and locks rotor 6 and consequently camera 2 in the desired tilt position.

The second embodiment differs from the first particularly in that the expansion section, which is deflected radially outwards towards an inner wall of receiving opening 7 when brake block 82' engages with brake disk 11, is not an integral component of brake caliper 8' but is formed by a separate expanding ring 20.

Expanding ring 20 has a substantially cylindrical outer circumferential surface and a conically formed inner circumferential surface which forms a complementary wedge surface 21 to wedge surface 19. In the present embodiment, expanding ring 20 additionally has a slot 22 running radially to make its deformation easier.

Unlike in the first embodiment, the wedge surfaces responsible for radial deflection of the expansion section are not therefore formed by the thread pairing between locking screw 9 and brake caliper 8' but by complementary wedge surfaces 19 and 21 on the outer circumference of main body 84' of brake caliper 8' or on the inner circumference of expanding ring 20.

Also according to the second embodiment, brake block 82 of brake caliper 8' is tightened against brake disk 11 when locking screw 9 is tightened. Main body 84' of brake caliper 8' is drawn towards the right in FIG. 7 and FIG. 8. Complementary wedge surfaces 19 and 21 on the outer circumference of main body 84' of brake caliper 8' or on the inner circumference of expanding ring 20 are thus pressed against each other with a force F directed perpendicular to these wedge surfaces 19, 21 (FIG. 8). This force F has an axial component Fa and a radial component Fr. Since a stop 61 is formed in receiving hole 7 for expanding ring 20, it cannot move further in the axial direction and is pushed radially outwards against the wall of receiving opening 7 in the housing side part of rotor 6 by way of the two complementary wedge surfaces 19, 21. As a result, brake caliper 8' is wedged in receiving hole 7.

In this way, a comparable effect is achieved to that of the first embodiment and any play between brake caliper 8' and receiving opening 7 is prevented or at least reduced.

Figure 9:
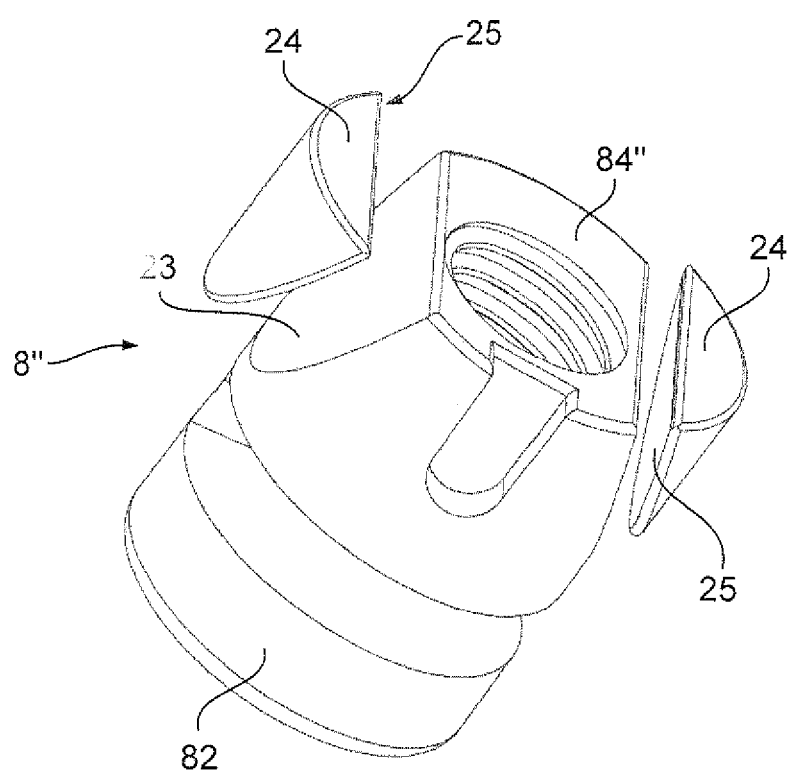
FIG. 9 a perspective view of a brake caliper and two expansion elements of a stop brake according to a third preferred embodiment of the invention.

FIG. 9 illustrates a brake caliper 8" of a stop brake according to a third preferred embodiment of the invention. The third embodiment differs from the second according to FIGS. 6 to 8 to the extent that two wedge elements 24 are now provided instead of expanding ring 20. Consequently, two bevels 23 on main body 84" of brake caliper 8", which cooperate with bevels 25 on wedge elements 24, are provided as complementary wedge surfaces.

The invention is not restricted to the embodiment described here but may be modified in the area of the adjacent claims as follows, for example.

Thus the stop brake might also be provided on panning device 4 of tripod head 1 instead of on tilting device 5 in order to lock the camera in a specific panning position.

In the first embodiment described above, a metric thread 81, 91 with a flank angle of 60° is used. As emerges from FIG. 5, radial component Fr of flank force F is therefore smaller than axial component Fa. Alternatively, a thread with a flank angle of 45° might be used; in this case, the radial and axial component would be the same size.

The invention claimed is:

1. A tripod head (1), particularly for film or television cameras, having a stop brake comprising:
   a substantially cylindrical brake caliper (8, 8', 8"), which has a main body (84, 84', 84") for insertion into a receiving opening (7) formed in a housing part of the tripod head (1) and a brake block (82) for engaging with a brake disk (11) provided in the tripod head (1), and
   a locking device in order to engage the brake block (82) with and disengage the brake block (82) from the brake disk (11),
   characterized in that
   provided in the region of the outer circumference of the main body (84, 84', 84") of the brake caliper (8, 8', 8") is an expansion section which is deflected radially outwards towards an inner wall of the receiving opening (7) when the brake block (82) engages with the brake disk (11).

2. A tripod head according to claim 1, in which the radial deflection of the expansion section on engaging the brake block (82) with the brake disk (11) takes place by two complementary wedge surfaces moveable in relation to each other.

3. A tripod head according to claim 2 in which the locking device is a locking screw (9) with an external thread (91) which cooperates with an internal thread (81) formed in the main body (84, 84', 84") of the brake caliper (8, 8', 8").

4. A tripod head according to claim 3, in which the external thread (91) on the locking screw (9) and the internal thread (81) in the main body (84) of the brake caliper (8) form the two complementary wedge surfaces.

5. A tripod head according to claim 1, in which the expansion section is an integral component of the main body (84) of the brake caliper (8) which is widened at least partially towards the inner wall of the receiving opening (7) when the brake block (82) engages with the brake disk (11).

6. A tripod head according to claim 5, in which the main body (84) of the brake caliper (8) as the expansion section has at least one lobe (85, 86) which is deflectable towards the inner wall of the receiving opening (7) when the brake caliper (8) engages with the brake disk (11).

7. A tripod head according to claim 1, in which the expansion section is a separate expansion element which is disposed on the outer circumference of the main body (84', 84") of the brake caliper (8', 8").

8. A tripod head according to claim 7, in which an expanding ring (20) is provided as the expansion element which is disposed around the outer circumference of the main body (84') of the brake caliper (8').

9. A tripod head according to claim 7, in which at least one wedge element (24) is provided as the expansion element which is disposed on the outer circumference of the main body (84") of the brake caliper (8").

10. A tripod head according to claim 7, in which the radial deflection of the expansion section on engaging the brake block (82', 82") with the brake disk (11) takes place by two complementary wedge surfaces, one (21, 25) of which is formed on the expansion element and the other (19, 23) on the main body (84', 84") of the brake caliper (8', 8").

11. A tripod head according to claim 1 in which the locking device is a locking screw (9) with an external thread (91) which cooperates with an internal thread (81) formed in the main body (84, 84', 84") of the brake caliper (8, 8', 8").

12. A tripod head according to claim 2, in which the expansion section is an integral component of the main body (84) of the brake caliper (8) which is widened at least partially towards the inner wall of the receiving opening (7) when the brake block (82) engages with the brake disk (11).

13. A tripod head according to claim 3, in which the expansion section is an integral component of the main body (84) of the brake caliper (8) which is widened at least partially towards the inner wall of the receiving opening (7) when the brake block (82) engages with the brake disk (11).

14. A tripod head according to claim 4, in which the expansion section is an integral component of the main body (84) of the brake caliper (8) which is widened at least partially towards the inner wall of the receiving opening (7) when the brake block (82) engages with the brake disk (11).

15. A tripod head according to claim 2, in which the expansion section is a separate expansion element which is disposed on the outer circumference of the main body (84', 84") of the brake caliper (8', 8").

16. A tripod head according to claim 8, in which the radial deflection of the expansion section on engaging the brake block (82', 82") with the brake disk (11) takes place by two complementary wedge surfaces, one (21, 25) of which is formed on the expansion element and the other (19, 23) on the main body (84', 84") of the brake caliper (8', 8").

17. A tripod head according to claim 9, in which the radial deflection of the expansion section on engaging the brake block (82', 82") with the brake disk (11) takes place by two complementary wedge surfaces, one (21, 25) of which is formed on the expansion element and the other (19, 23) on the main body (84', 84") of the brake caliper (8', 8").

* * * * *